United States Patent Office 3,658,965
Patented Apr. 25, 1972

3,658,965
FUNGICIDAL HALOGENATED FLUORO-SULFONATED PHENOLS
Harold J. Miller, Newtown Square, Pa., and James L. Sandeno, Tacoma, Wash., assignors to Pennsalt Chemicals Corporation, Philadelphia, Pa.
No Drawing. Filed Dec. 12, 1968, Ser. No. 783,405
Int. Cl. A01n 9/14
U.S. Cl. 424—315                                    1 Claim

ABSTRACT OF THE DISCLOSURE

Fluorosulfonated phenol derivatives selected from the group consisting of 5-chloro-2-hydroxybenzenesulfonyl fluoride, 3-fluoro-4-hydroxybenzenesulfonyl fluoride, and 2-fluoro-4-hydroxybenzenesulfonyl fluoride are effective in protecting plants against attack by soil-borne fungi.

---

This invention relates to a method for protecting plants from pathogenic fungi. In one aspect it is concerned with the treatment of agricultural soils infested with phytopathogenic soil-borne fungi in order to protect plants against attack by these microorganisms. More particularly, this invention involves a method for protecting plants from soil fungi by applying to the locus to be protected an effective funicidal quantity of a specific halogenated fluorosulfonated phenol derivative, i.e., 5-chloro-2-hydroxybenzenesulfonyl fluoride, 3-fluoro-4-hydroxybenzenesulfonyl fluoride, or 2-fluoro-4-hydroxybenzenesulfonyl fluoride.

Many of the organisms that inhabit the soil subsist on living plants and may injure the roots and other underground portions, others may attack the crown of the plant, while still others are capable of damaging the stem and other above-ground portions of the plant. Soil fungi attack a broad spectrum of plants including field crops, truck crops, cereals and grasses, and ornamental and house plants. The seriousness of the problem is enhanced when plants are grown year after year in the same soil because the ready food supply nourishes the pathogens.

The specific halogenated fluorosulfonated phenol derivatives embodied in this invention are extremely effective as soil fungicides and are minimally phytotoxic to the plants sought to be protected using fungicidally effective dosages, which lower dosage levels advantageously provide more effective fungus control than the conventional volatile chemicals normally used as fungicides at higher concentrations of application. The compounds are effective against most of the more prominent genera of fungi that cause rot and damping off of plants, including species of Rhizoctonia, Pythium, Fusarium, Verticillium, Sclerotinia, Aphanomyces, Asocochyta, Phytophthora and Thielaviopsis. The good fungicidal activity of the compounds embodied herein is surprising in view of the fact that analogous compounds differing therefrom in only position isomerism or a minor change in substituency are comparatively poor fungicides. In addition, tests have shown that halogenated aliphatic sulfonyl fluorides are comparatively ineffective.

In accordance with this invention, the aforementioned fungicidal agents are applied to the locus to be protected in sufficient amount to kill or otherwise effectively inhibit the development of soil fungi that are pathogenic to plants. In general, application in the range of from about 0.1 pound to about 20 pounds of the active agent per acre of surface thus treated gives effective control of the soil-borne fungi, the preferred amount depending upon environmental factors. The optimum dosage will vary somewhat depending on such factors as the specific compound used, soil type, method of application, climatic conditions, crop response, stage of plant development at time of treatment, etc. The optimum dosage in a specific treatment can be readily determined by one having ordinary skill in the art.

The fungicides embodied in this invention, which are crystalline solids with melting points on the order of 70° C., may be formulated for application to the soil as dispersions or solutions in organic solvents or emulsifiable oils. To prepare the dispersion a suitable wetting agent may be added which aids in the preparation of the formulation and which also serves to help penetration of the compound into the soil surfaces. Suitable dispersion concentrates may be prepared with or without suspending agents by ball milling or other fine grinding techniques. Suspending agents will be selected from the various agents readily available, such as lignin sulfonates, bentonite, dilute solutions of Methocel, and the like. Formulations may also be prepared as emulsion concentrates for dilution with water for field applications. These may be prepared by the use of suitable solvents such as xylene, heavy aromatic naphtha, isophorone, benzene, heptane, heavy mineral oils, kerosene, and other solvents immiscible with water, with the addition of a suitable anionic, cationic, or nonionic emulsifying agent such as long-chain alkyl benzene sulfonates or polyglycol ethers. In lieu of said dispersion or oil-in-water emulsion, the compounds may be prepared and applied merely as a solution in an organic solvent, such as those solvents mentioned above, or in such water-miscible solvents as diacetone alcohol, acetone, dimethyl sulfoxide, dimethyl formamide, phosphoric acid esters, etc. The latter solutions can also be diluted with water to the desired concentrations. The compounds are preferably applied as formulations of wettable powders which are prepared by direct grinding of the compound with a blend of suitable carrying agent such as attapulgite, bentonite, kieselguhr and the like. It is desirable to grind such a blend in a hammer mill so that 99% will pass through a 325 mesh screen. Wettable powders may also be prepared by absorbing a solution of the compound in a solvent such as xylene or acetone on a powdered clay such as attapulgite or diatomaceous earth. All wettable powder preparations may contain a dispersing agent such as a lignin sulfonate and a wetting agent such as an alkylaryl polyether glycol. The concentration of the fungicide will, in general, range from about 0.01% to about 75% by weight of the total formulation, i.e., of the combined weight of the fungicidal agent and the carrier medium, whether liquid or/and powder. The techniques of preparing fungicidal formulations by compounding carriers with the fungicidal agent are well known to those acquainted with the art.

While the preferred method of utilizing the fungicidal agents is to apply the formulation to the soil to prevent infection of seedlings by the pathogenic organisms, other methods such as "hopper box" and "furrow" treatments can be used to achieve essentially the same results, wherein, for example, the formulation, is contacted with the seed in the hopper box of the planting apparatus prior to the planting operation. These methods also eliminate any organisms borne on the seed itself.

The following examples are presented to illustrate the invention and should not be construed as limitative of its scope as disclosed above and defined by the appended claim.

EXAMPLES

The procedures for synthesizing the compounds embodied in this invention (Examples 1–3) and others tested for comparative purposes (Examples 4–7) are next presented, or a reference may be cited which further describes the preparation.

EXAMPLE I

5-chloro-2-hydroxybenzenesulfonyl fluoride

In accordance with the procedures of U.S. Pat. No. 2,686,202, p-chlorophenol (0.5 mole) is added incrementally to fluosulfonic acid (2 moles) cooled in an ice bath. The solution stands overnight at room temperature and is then poured onto cracked ice. The resulting emulsion is treated with diethyl ether as an extractive solvent. Removal of the ether from the extract layer by distillation, and recrystallization of the residue from solution in carbon tetrachloride yields about a 90% recovery of the product, M.P. 69–71° C.

EXAMPLE II

3-fluoro-4-hydroxybenzenesulfonyl fluoride

2-Fluorophenol (0.36 mole) is reacted with fluosulfonic acid (4.5 moles) as in the previous example. The reaction mixture is charged to cracked ice and extracted with ether. Removal of the ether and crystallization from $CCl_4$ solution yields the desired product (21% conversion); M.P. 70–71° C.

EXAMPLE III

2-fluoro-4-hydroxybenzenesulfonyl fluoride

The compound (M.P. 70–73° C.) is prepared from m-fluorophenol reacted with fluosulfonic acid as in the previous example.

EXAMPLE IV

4-chloro-2-hydroxybenzenesulfonyl fluoride

This crystalline compound (M.P. 69–75° C.) is prepared from m-chlorophenol reacted with fluorsulfonic acid as in the previous examples.

EXAMPLE V

3-chloro-4-hydroxybenzene sulfonyl fluoride

This crystalline compound (M.P. 79–81° C.) is prepared from o-chlorophenol reacted with fluosulfonic acid as in the preceding examples.

EXAMPLE VI

5-chloro-2-hydroxybenzenesulfonyl chloride

The crystalline compound (M.P. 37–38° C.) is prepared according to the techniques of Example 1 and U.S. 2,686,202 except that chlorosulfonic acid is substituted for the fluosulfonic acid reactant.

EXAMPLE VII

Chlorinated octanesulfonyl fluoride

Chlorine gas (0.5 mole) is bubbled at 50 to 60° C. through octanesulfonyl fluoride ($C_8H_{17}SO_2F$, 0.1 mole, a colorless oily liquid) under ultraviolet radiation over a five hour period. Elemental analysis of the colorless oily liquid product shows it to be a mixture of chlorinated octanesulfonyl fluorides with the average empirical formula $C_8H_{13.5}Cl_{3.5}SO_2F$.

The structural relationship of the foregoing compounds is illustrated by the following comparative delineation:

Example 1
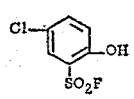

Example 2
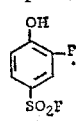

Example 3
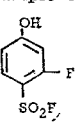

Example 4
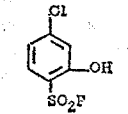

Example 5
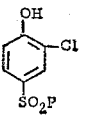

Example 6
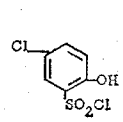

Example 7

$C_8H_{13.5}Cl_{3.5}SO_2F$

The compounds are evaluated as soil fungicides using the following representative wettable powder formulation:

| Ingredient: | Percent by wt. |
|---|---|
| Fluorosulfonated compound | 25 |
| Powder carrier (fine particles size hydrated silica: "Hi-Sil") | 65 |
| Dispersing agent (sodium lignosulfonate: "Marasperse N") | 5 |
| Wetting agent (lineal alkyl naphthalene sulfonate: "Petro WPX") | 5 |

The soil fungicide effectiveness of the compound is determined with the standard screening agar plate test against these fungal organisms: *Fusarium roseum*; *Pythium ultimum*; *Verticillium albo-atrum*; and *Rhizoctonia solani*. According to the agar plate test, the compound is added to melted potato dextrose agar to obtain test concentrations of 500, 100 and 10 p.p.m. active ingredient. The treated agar is poured into sterile Petri dishes and after solidifying, it is inoculated with plugs of the test organisms. After 72 hours the plates are observed and the amount of growth recorded. Of the compounds screened, those labeled above as Examples 1, 2 and 3 show excellent results in inhibiting organism growth. However, the fungal organisms grow and thrive in the medium treated with the analogous compound labeled above as Example 7. The compound of Example 1 is further tested and found to be active at 10 p.p.m. against these additional organisms: *Phytophthora cactorum*; *Phytophthora cinnamoni*; *Phytophthora citrophthora*; *Pythium aphanidermatum*; *Sclerotinia sclerotiorium*; and *Selerotium rolfsii*.

All of the foregoing compounds are evaluated in a more definitive soil fungicide test as follows. The proper amount of the compound needed to treat a surface area of 0.25 square foot at the desired rate of application is formulated in a wettable powder formulation using attapulgite clay ("Diluex A"). The seed of 10 cucumber, 10 cotton and 30 monogerm sugar beet are then mixed with the formulation. The treated seeds are screened out and placed on the surface of naturally infested soil in 0.25 square foot wooden flats. The remaining formulation is then thoroughly mixed with enough soil to cover the seed to a depth of 0.5 inch. The flats are placed in the greenhouse, watered and covered with glass till the plants begin to emerge. All seedlings are examined two weeks after treatment and the percentage of disease free plants recorded. Test rates used are 5 and 15 pounds of active ingredient (fluorosulfonated compound) per acre of surface area. The results show that the compounds labeled Examples 1, 2 and 3 give effective control of the soil pathogens even at lower rates of application, there being at least a majority and usually 100% emergence of disease-free plants. The best results are achieved with 5-chloro-2-hydroxybenzenesulfonyl fluoride as the fungicide. However, with the compounds labeled Examples 4–7, the control of fungi is unacceptable with from none to at most about 40% of the emerging plants being protected by these agents.

The fungicides embodied herein may be formulated in admixture with one or more known soil fungicides for added effectiveness such as, for example, the commercially available agents p-dimethylaminobenzenediazo sodium sulfonate; tetramethylthiuramdisulfide; methylmercury dicyandiamide; 1-chloro-2-nitropropane; pentachloronitrobenzene; N(trichloromethylthio)-4-cyclohexene-1,2 - dicarboximide; and N-trichloromethylthiotetrahydrophthalimide.

We claim:
1. A method of controlling fungi in soil which comprises contacting the fungi with a fungicidally effective amount of a compound selected from the group consisting of 5-chloro-2-hydroxybenzenesulfonyl fluoride, 3-fluoro-4-hydroxybenzenesulfonyl fluoride, and 2-fluoro-4-hydroxybenzenesulfonyl fluoride.

References Cited
UNITED STATES PATENTS

| | | | |
|---|---|---|---|
| 2,233,407 | 3/1941 | Flett | 424—315 |
| 2,686,202 | 8/1954 | McCoy et al. | 260—543 |
| 2,911,439 | 11/1959 | Meikle | 260—543 |
| 3,043,866 | 7/1962 | Oja | 424—315 X |
| 3,085,041 | 4/1963 | Buchanan | 424—315 |
| 3,436,462 | 4/1949 | Esteve-Subirana | 424—315 X |
| 3,453,099 | 7/1969 | Popoff et al. | 471—103 |

OTHER REFERENCES

Gamble et al.: "Respiration Rates and Plate Counts for Determining Effect of Herbicides on Heterotrophic Soil Microorganisms," Soil Science, vol. 74, pp. 347–50 (1952).

JEROME T. GOLDBERG, Primary Examiner

L. SCHENKMAN, Assistant Examiner